United States Patent
Yu et al.

(10) Patent No.: US 12,184,419 B2
(45) Date of Patent: Dec. 31, 2024

(54) METHOD AND APPARATUS FOR HARQ FEEDBACK

(71) Applicant: LENOVO (BEIJING) LIMITED, Beijing (CN)

(72) Inventors: Xiaodong Yu, Beijing (CN); Zhennian Sun, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 372 days.

(21) Appl. No.: 17/622,428

(22) PCT Filed: Jun. 26, 2019

(86) PCT No.: PCT/CN2019/093070
§ 371 (c)(1),
(2) Date: Dec. 23, 2021

(87) PCT Pub. No.: WO2020/258086
PCT Pub. Date: Dec. 30, 2020

(65) Prior Publication Data
US 2022/0337347 A1    Oct. 20, 2022

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1861* (2013.01); *H04W 4/023* (2013.01); *H04W 4/40* (2018.02)

(58) Field of Classification Search
None
See application file for complete search history.

(56) References Cited

U.S. PATENT DOCUMENTS

| 10,893,390 B2* | 1/2021 | Lee ......................... H04W 4/40 |
| 2022/0141815 A1* | 5/2022 | Lee ....................... H04W 76/14 |
| | | 455/452.1 |

FOREIGN PATENT DOCUMENTS

| CN | 108781441 A | 11/2018 |
| WO | 2018145296 A1 | 8/2018 |

OTHER PUBLICATIONS

International Searching Authority, "Written Opinion of the International Searching Authority," PCT/CN2019/093070, Mar. 9, 2020, pp. 1-3.

(Continued)

*Primary Examiner* — Anh Ngoc M Nguyen
(74) *Attorney, Agent, or Firm* — Kunzler Bean & Adamson

(57) ABSTRACT

Embodiments of the present disclosure relate to method and apparatus for HARQ feedback. According to an embodiment of the present disclosure, a method can include: transmitting, to a first user equipment (UE), location information of a second UE and a communication range required for at least one sidelink transmission from the second UE, wherein each of the at least one sidelink transmission comprises a set of transport blocks (TBs); detecting feedback information associated with a corresponding TB of the set of TBs from the first UE on a set of feedback resources; and determining whether to retransmit the corresponding TB of the set of TBs based on the detection result of the feedback information. Embodiments of the present disclosure can avoid unnecessary retransmission and can improve transmission efficiency in NR V2X groupcast communication.

20 Claims, 5 Drawing Sheets

(51) Int. Cl.
*H04W 4/02* (2018.01)
*H04W 4/40* (2018.01)

(56) References Cited

OTHER PUBLICATIONS

Qualcomm Incorporated, Design aspects and requirements for QoS, 3GPP TSG RAN WG1 Meeting #95, R1-1813427, Nov. 12-16, 2018, pp. 1-6, Spokane, USA.

* cited by examiner

METHOD AND APPARATUS FOR HARQ FEEDBACK

TECHNICAL FIELD

Embodiments of the present disclosure are related to wireless communication technology, and more particularly, related to methods and apparatuses for HARQ feedback in new radio (NR) vehicle to everything (V2X) groupcast communication.

BACKGROUND

To expand the 3rd generation partnership project (3GPP) platform to the automotive industry, the initial standard on support of vehicle to vehicle (V2V) services was completed in September 2016. Enhancements focusing on additional V2X operation scenarios leveraging the cellular infrastructure, are completed in March 2017 as 3GPP V2X phase 1 for inclusion in Rel-14 long term evolution (LTE).

3GPP V2X phase 2 in Rel-15 LTE introduces a number of new features in sidelink, including: carrier aggregation, high order modulation, latency reduction, and feasibility study on both transmission diversity and short transmission time interval (TTI) on sidelink.

3GPP V2X phase 3 in NR identifies 25 use cases for advanced V2X services, which are categorized into four use case groups: vehicles platooning, extended sensors, advanced driving and remote driving.

In 3GPP radio layer 1 (RAN1) #96bis meeting, an agreement is made for V2X sidelink communication. According to the agreement, hybrid automatic repeat request acknowledgement (HARQ) non-acknowledgement (NACK) only feedback mechanism and HARQ acknowledgement (ACK)/NACK mechanism were supported for V2X sidelink communication. Detailed description of each mechanism is provided below.

HARQ NACK only feedback mechanism means that the receiving user equipment (Rx UE) transmits HARQ-NACK on physical sidelink feedback channel (PSFCH) if it fails to decode the corresponding transport block (TB) after decoding the associated physical sidelink control channel (PSCCH). Otherwise, the receiving UE does not transmit any signal on PSFCH.

HARQ ACK/NACK feedback mechanism means that after decoding the associated PSCCH which targets the Rx UE, the Rx UE transmits HARQ-ACK on PSFCH if it successfully decodes the corresponding TB or transmits HARQ-NACK on PSFCH if it does not successfully decode the corresponding TB.

However, a transmitting (Tx) UE cannot determine whether a Rx UE is in/out of communication range of a sidelink transmission from the Tx UE, and the Tx UE may perform retransmission to a Rx UE that is out of the communication range. Thus, additional criterions for HARQ feedback in V2X sidelink communication are needed.

SUMMARY OF THE DISCLOSURE

One object of embodiments of the present disclosure is to provide an improved technical solution for HARQ feedback in NR V2X sidelink communication.

According to an embodiment of the present disclosure, a method may include: transmitting, to a first UE, location information of a second UE and a communication range required for at least one sidelink transmission from the second UE, wherein each of the at least one sidelink transmission may include a set of TBs; detecting feedback information associated with a corresponding TB of the set of TBs from the first UE on a set of feedback resources; and determining whether to retransmit the corresponding TB of the set of TBs based on the detection result of the feedback information.

In an embodiment of the present disclosure, the detected feedback information may include at least one of: HARQ ACK/NACK response for each TB of the set of TBs; and relative location information of the first UE, which is associated with the location information of the second UE and the communication range.

In another embodiment of the present disclosure, the set of feedback resources may be configured by high-layer signaling.

In yet another embodiment of the present disclosure, the method may further include: indicating the set of feedback resources by physical layer control information.

In yet another embodiment of the present disclosure, the set of feedback resources may include first feedback resource for carrying the HARQ ACK/NACK response in the case that the first UE being within the communication range and a second feedback resource for carrying the HARQ ACK/NACK response in the case that the first UE being out of the communication range According to another embodiment of the present disclosure, a method may include: receiving, at a first UE, location information of a second UE and a communication range required for at least one sidelink transmission from the second UE, wherein each of the at least one sidelink transmission may include a set of TBs; determining relative location information of the first UE based on the received location information of the second UE and the communication range; and transmitting feedback information for the set of TBs on a set of feedback resources at least based on the relative location information.

In an embodiment of the present disclosure, the relative location information may indicate that the first UE is within the communication range or the first UE is out of the communication range.

An embodiment of the present disclosure also provide an apparatus, including: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to an embodiment of the present disclosure with the at least one receiver, the at least one transmitter and the at least one processor.

Embodiments of the present disclosure provide a technical solution for HARQ feedback in V2X sidelink communication, especially V2X groupcast communication, which can avoid unnecessary retransmission and can improve spectrum efficiency in NR V2X groupcast communication.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered limiting of its scope.

DETAILED DESCRIPTION

Figure 1:
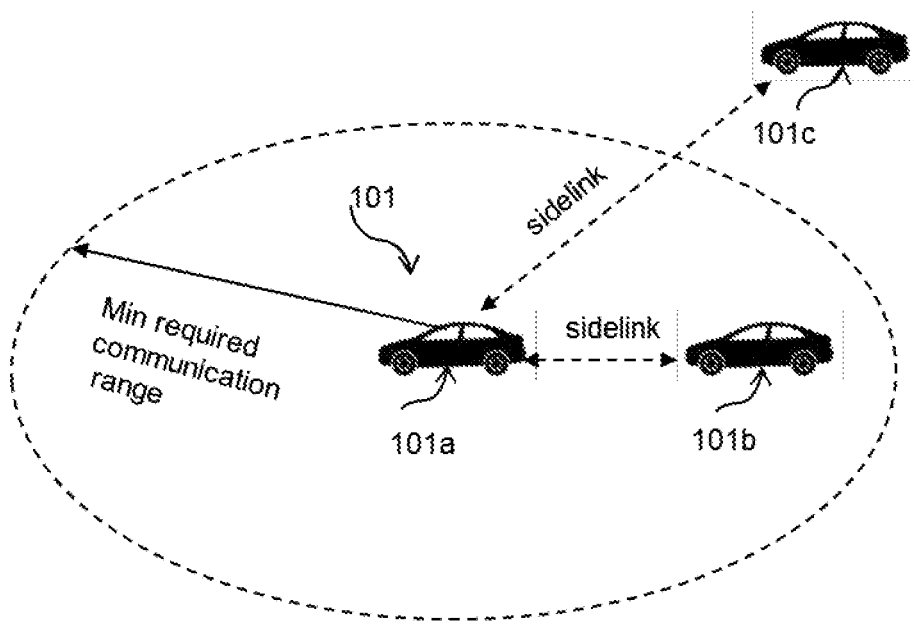
FIG. 1 is a schematic view of a groupcast communication scenario according to an embodiment of the present disclosure.

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In V2X sidelink communication, two HARQ feedback schemes or mechanisms may be supported. The first scheme is HARQ NACK only feedback and the second scheme is HARQ ACK/NACK feedback. In addition, TB-based retransmission is supported in NR for HARQ feedback. For the TB-based retransmission, one HARQ-ACK feedback bit corresponds to one TB.

In the scheme of HARQ NACK only feedback, only in the case that a TB transmitted by a Tx UE is not correctly decoded at a Rx UE, the Rx UE may transmit NACK to the Tx UE for the TB on a feedback channel (e.g., PSFCH). In other cases, for example when a TB being correctly decoded at a Rx UE or discontinuous transmission (DTX) of the Rx UE, the Rx UE may not transmit any signal on the feedback channel (e.g., PSFCH). DTX of a Rx UE means that a Rx UE fails to decode the control channel (e.g., PSCCH) indicating the TB so that the Rx UE does not transmit feedback information on the feedback channel.

Correspondingly, the Tx UE may detect whether NACK for the TB is transmitted on the feedback channel. For the HARQ NACK only feedback, the Tx UE may retransmit the TB only in response to NACK for the TB being detected and not retransmit the TB in response to no signal being detected on the feedback channel. In the case that the Tx UE failed to detect the HARQ feedback information (i.e., NACK) transmitted by the Rx UE, which may be caused by bad channel condition, DTX of the Rx UE etc., the Tx UE will not retransmit the TB due to no NACK being detected.

In the scheme of HARQ ACK/NACK feedback, in the case that a TB transmitted by a Tx UE is not correctly decoded at a Rx UE, the Rx UE may transmit a NACK to the Tx UE on the feedback channel for the TB received. In the case that a TB transmitted by a Tx UE is correctly decoded at a Rx UE, the Rx UE may transmit ACK to the Tx UE on the feedback channel. In the case that the Rx UE fails to decode the control channel indicating the TB, the Rx UE may not transmit any signal on the feedback channel, which may be called as DTX of the Rx UE.

Correspondingly, the Tx UE may detect whether ACK or NACK, for the earlier transmitted TB, is transmitted on the feedback channel. The Tx UE may retransmit a TB in response to NACK being received for the TB detected by an Rx UE and not retransmit a TB in response to ACK for the TB being detected. In the case that the Tx UE failed to detect the HARQ feedback information (i.e., ACK or NACK) transmitted by the Rx UE, which may be caused by bad channel condition, DTX of the Rx UE etc., the Tx UE will also retransmit the TB. According to another embodiment of the present disclosure, in the case that the Tx UE failed to detect the HARQ feedback information transmitted by the Rx UE, which may be caused by bad channel condition, DTX of the Rx UE etc., the Tx UE will not retransmit the TB.

The specific application scenarios of the two schemes may be further illustrated as follows.

For the scheme of HARQ NACK only feedback, a Tx UE, may not know the existence of Rx UE(s). That is, no groupcast connection established between the Tx UE and the Rx UEs. In this case, no dedicated HARQ feedback resource is configured for a Rx UE to transmit HARQ feedback to the Tx UE. Instead, multiple Rx UEs may transmit feedback information on the same feedback resource, that is, multiple Rx UEs share the same PSFCH.

For the scheme of ACK/NACK feedback, a Tx UE knows the existence of each Rx UE within a V2X group including the Tx UE by a groupcast connection establishment procedure. Accordingly, the Tx UE may assign dedicated HARQ ACK/NACK feedback resources for each Rx UE within the group, i.e., each Rx UE may use a separated PSFCH to transmit HARQ ACK/NACK feedback to the Tx UE. In that way, each Rx UE may transmit HARQ ACK/NACK feedback on the assigned resource based on its own decoding state of data channel (e.g., PSSCH) indicated by control channel (e.g., PSCCH).

The above two HARQ feedback schemes may be used in a groupcast communication illustrated in FIG. 1. Specifically, FIG. 1 is a schematic view of a groupcast communication scenario according to an embodiment of the present disclosure.

As shown in FIG. 1, a V2X group may include at least one Tx UE and at least one Rx UE. In particular, the V2X group may include three UEs 101, e.g., UE 101*a*, UE 101*b* and UE 101*c* for illustrative purpose. The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. According to an embodiment of the present disclosure, the UEs 101 may include a vehicle. In some embodiments of the present disclosure, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

The UE 101*a* may be a transmitting UE (i.e., Tx UE) which may send a transmission or a packet. The transmission or the packet may include at least one TB. Both the UE 101b and UE 101c may be Rx UEs, which may receive the transmission or the packet from the Tx UE. Although only the UEs 101a, 101b and 101c within one group are shown for illustrating the embodiment of the present disclosure in a simplified manner, persons skilled in the art should understand there can be more UEs and more groups.

For the transmission or the packet from the Tx UE, Rx UE can decide whether to send HARQ feedback for the received transmission or packet based on Tx-Rx distance, reference under the scenario, and different scenarios have different Min required communication range. For example, for the scenario of "Cooperative driving for vehicle platooning Information exchange between a group of UEs supporting V2X application", the Min required communication range is 350 meters, 80 meters, and 180 meters for the low degree of automation, the highest degree of automation, and the high degree of automation, respectively.

TABLE 5.2.1

Performance requirements for Vehicles Platooning

| scenario description | | | Payload | Tx rate (Message/ | Max end-to-end latency | Reliability (%) | Data rate | Min required communiction range (meters) |
|---|---|---|---|---|---|---|---|---|
| Scenario | Degree | Req # | (Bytes) | Sec) | (ms) | (NOTE 5) | (Mbps) | (NOTE 6) |
| Cooperative driving for vehicle platooning Information exchange between a group of UEs supporting V2X application | Lowest degree of automation | [R.5.2-004] | 300-400 (NOTE 2) | 30 | 25 | 90 | | |
| | Low degree of automation | [R.5.2-005] | 6500 (NOTE 3) | 50 | 20 | | | 350 |
| | Highest degree of automation | [R.5.2-006] | 50-1200 (NOTE 4) | 30 | 10 | 99.99 | | 80 |
| | High degree of automation | [R.5.2-007] | | | 20 | | 65 (NOTE 3) | 180 |
| Reporting needed for platooning | N/A | [R.5.2-008] | 50-1200 | 2 | 500 | | | |
| Information sharing for platooning between UE supporting V2X application and RSU. | Lower degree of automation | [R.5.2-009] | 6000 (NOTE 3) | 50 | 20 | | | 350 |
| | Higher degree of automation | [R.5.2-0010] | | | 20 | | 50 (NOTE 3) | 180 |

NOTE 2:
This value is applicable for both triggered and periodic transmission of data packets.
NOTE 3:
The data that is considered in this V2X scenario includes both cooperative manoeuvres and cooperative perception data that could be exchanged using two separate messages within the same period of time (e.g., required latency 20 ms).
NOTE 4:
This value does not including security related messages component.
NOTE 5:
Sufficient reliability should be provided even for cells having no value in this table
NOTE 6:
This is obtained considering UE speed of 130 km/h. All vehicles in a platoon are driving in the same direction.

signal received power (RSRP) or the combination of Tx-RX distance and RSRP. Generally, HARQ feedback based on Tx-Rx distance, RSRP or the combination of Tx-RX distance and RSRP can use a parameter that indicates the minimum distance that the quality of service (QoS) parameters needed to be fulfilled, for example the "Min required communication range" parameter identified in Table 5.2.1

The Min required communication range may be different for different V2X communication scenarios or traffic types. For example, Table 5.2.1 defined in TS 22.886 specified by 3GPP illustrates performance requirements for vehicles platooning, which includes the Min required communication range for different scenarios or traffic types.

Referring to Table 5.2.1, each scenario provides a Min required communication range for at least one transmission Accordingly, for a certain packet or transmission from a Tx UE, the Min required communication range may be different. For a Rx UE out of the Min required communication range of a Tx UE's packet or transmission, the Rx UE is not required to decode the packet/transmission successfully even if the Rx UE can decode it. Accordingly, for the Rx UE out of the Min required communication range, retransmission from the Tx UE is also not required.

In the first scheme, i.e., HARQ NACK only feedback, since the Tx UE, e.g., 101a may perform retransmission merely in the case that it receives NACK. Therefore, to avoid unnecessary transmission for the Rx UE, e.g., 101c out of the Min required communication range, the Rx UE, e.g., 101c can drop the HARQ NACK feedback to avoid triggering unnecessary retransmission from the Tx UE. That is, for the HARQ NACK only feedback, to avoid the unnecessary retransmission for the Rx UE out of the Min required communication range, only the Rx UE, e.g., 101b within the Min required communication range will transmit HARQ NACK feedback to the Tx UE. The Rx UE, e.g., 101a out of Min required communication range will not transmit HARQ NACK feedback to the Tx UE to avoid triggering unnecessary retransmission from the Tx UE.

However, for the second scheme, i.e., HARQ ACK/NACK feedback, although a Tx UE knows the existence of each UE within a V2X group including the Tx UE, the Tx UE cannot distinguish the DTX state of Rx UE regardless a Rx UE being within or out of Min required communication range of a transmission. Thus, retransmission caused by the DTX state of Rx UE has to be seriously considered in the scheme of HARQ ACK/NACK feedback. Accordingly, for a Rx UE out of the Min required communication range of a transmission from the Tx UE, the Tx UE may also perform retransmission when the Tx UE does not detect ACK or NACK on the assigned resource. However, such retransmission is not necessary for the Rx UE out of the communication range. The unnecessary retransmission will increase the transmission collision probability, delay the new TB transmission, and waste the transmission power of the Tx UE.

Therefore, it is necessary to design a novel HARQ feedback method in V2X sidelink communication so as to avoid unnecessary retransmission and improve spectrum efficiency.

Embodiments of the present disclosure propose a novel HARQ feedback method and apparatus, which can solve the technical problem of increasing the transmission collision probability, delaying the new TB transmission, and wasting the transmit power of a Tx UE.

More details on the embodiments of the present disclosure will be illustrated in the following text in combination with the appended drawings.

Figure 2:
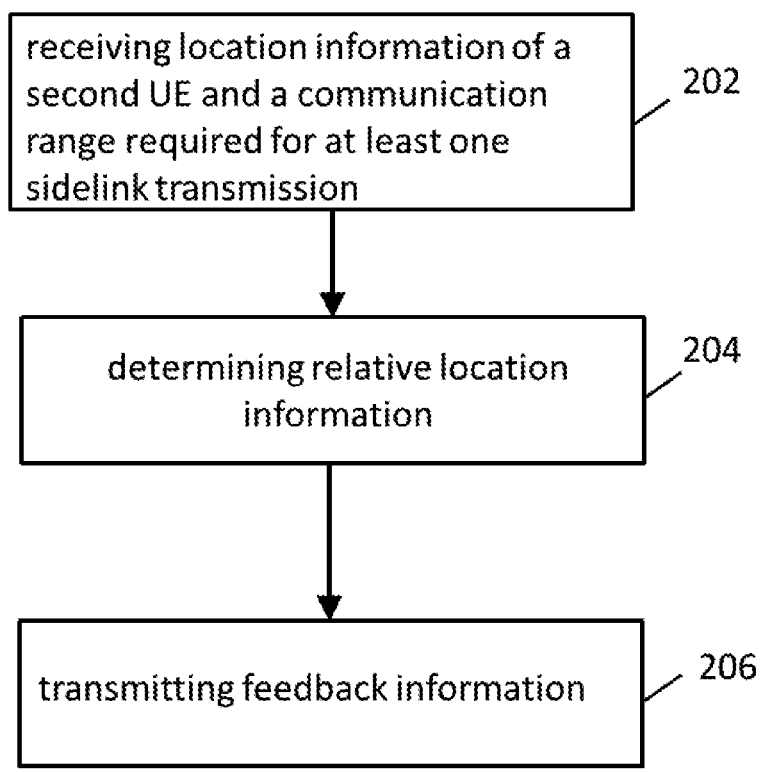
FIG. 2 is a flow chart illustrating a method for HARQ feedback according to an embodiment of the present disclosure.

FIG. 2 is a flow chart illustrating a method for HARQ feedback according to an embodiment of the present disclosure. The method may be performed by a Rx UE (hereinafter "a first UE"). The first UE may be a UE within the communication range required for at least one sidelink transmission from the Tx UE, for example UE 101b as shown in FIG. 1. The first UE may also be a UE out of the communication range required for the at least one sidelink transmission from the Tx UE, for example UE 101c as shown in FIG. 1. The first UE may be a V2X UE, such as a vehicle.

As shown in FIG. 2, in step 202, the first UE, for example UE 101b or UE 101c may receive location information of a Tx UE (hereafter "a second UE") for example, the UE 101a as shown in FIG. 1 and a communication range required for at least one sidelink transmission from the second UE. The second UE may also be a V2X UE, such as a vehicle. Each of the at least one sidelink transmission may include a set of TBs, for example, one or more TBs. The location information and the communication range required for the at least one sidelink transmission may be indicated by the control information on the control channel, for example PSCCH. The control information may also indicate the set of TB on the data channel, for example physical sidelink shared channel (PSSCH).

After receiving the control information, the first UE may decode the control information, after correctly decoding the control information, at step 204, the first UE may determine relative location information of the first UE based on the received location information of the second UE and the communication range required for at least one sidelink transmission from the Tx UE. The relative location information may indicate that the first UE is within the communication range or the first UE is out of the communication range. The communication range can be the Min required communication range provided in Table 5.2.1.

Specifically, the relative location information may be determined based on the location information of the second UE, the communication range, and the first UE's own location. For example, the first UE may estimate the distance between the first UE and the second UE based on the first UE's location and the second UE's location, and compare the distance with the communication range to determine whether the first UE is within the communication range or out of the communication range. The relative location information may be one bit with a value "0" or "1." For example, the value "0" may represent that the first UE is within the communication range and value "1" may represent that the first UE is out of the communication range. In another example, the value "0" may represent that the first UE is out of the communication range, while value "1" may represent that the first UE is within the communication range.

After determining the relative location information, the first UE may transmit feedback information for the set of TBs on a set of feedback resources at least based on the relative location information at step 206. The detected feedback information may include at least one of: HARQ ACK/NACK response for each TB of the set of TBs, and relative location information of the first UE.

The HARQ ACK/NACK response for each TB may be one bit with a value "0" or "1." For example, assuming that one sidelink transmission includes one TB, the value "0" may represent "NACK" for a TB, and value "1" may represent "ACK" for the TB. Alternatively, the value "1" may represent "NACK" for a TB and the value "0" may represent "ACK" for the TB. In another example, assuming that one sidelink transmission includes two TBs, two HARQ ACK/NACK response bits may be used to indicate the decoding states of the two TBs, respectively. Specifically, the first bit of two bits may represent the decoding state (i.e., ACK or NACK) of a TB, and the second bit of the two bits may represent the decoding state (i.e., ACK or NACK) of the other TB.

According to some embodiments of the present disclosure, the set of feedback resources may be configured by high-layer signaling from a base station, for example the RRC signaling. The high-layer signaling may configure the set of feedback resources to have pre-defined association with transmitted PSCCH or PSSCH, and the pre-defined association can be time domain or frequency domain offset, or the combination of time domain offset and frequency domain offset. In this case, the first UE may receive the high-layer signaling from the base station or from the second UE which may transfer the information indicated by the high-layer signaling to the first UE.

According to some embodiments of the present disclosure, the set of feedback resources may be indicated in the physical layer control information, for example the control information carried on PSCCH.

According to an embodiment of the present disclosure, the set of feedback resources may be configured to be only one feedback resource for carrying the HARQ ACK/NACK response and the relative location information of the first UE simultaneously. For example, assuming that a transmission includes two TBs, 3 bits can be configured for the feedback resource, wherein 2 bits are for the HARQ ACK/NACK response for the two TBs respectively and 1 bit is for indicating the relative location information of the first UE.

Specifically, according to some embodiments of the present disclosure, the first UE may transmit the feedback information on the one feedback resource regardless of the first UE being within or out of the communication range. The feedback information may include a HARQ ACK/NACK response for each TB of the set of TBs and the relative location information of the first UE which indicates that the first UE is within or out of the communication range on one feedback resource.

For example, assuming that the received transmission includes two TBs, the feedback information may include 1 bit with value "0" to represent NACK for a TB not being successfully decoded, include 1 bit with value "1" to represent ACK for a TB being successfully decoded, and include 1 bit with value "1" to represent that the first UE is within the commination range. For the TB not being successfully decoded, the second UE may retransmit it after detecting the feedback information from the first UE due to the first UE being within the communication range.

According to another embodiment of the present disclosure, the feedback information may include 1 bit with value "0" to represent NACK for the first TB, include 1 bit with value "1" to represent ACK for the second TB, and include 1 bit with value "0" to represent that the first UE is out of the commination range. For the TB not being successfully decoded, the second UE may not retransmit it after detecting the feedback information from the first UE due to the first UE being out of the communication range.

According to yet another embodiment of the present application, in the case that the first UE is out of the communication range, the HARQ ACK/NACK response can be the same for each TB, for example, being ACK for each TB. The Tx UE may not perform retransmission to a RX UE out of the communication range regardless of ACK or NACK being detected.

According to some other embodiments of the present disclosure, the first UE may only transmit the feedback information on the one feedback resource in the case that the determined relative location information indicates that the first UE is within the communication range. The feedback information may include a HARQ ACK/NACK response for each TB of the set of TBs and the relative location information of the first UE indicating that the first UE is within the communication range on one feedback resource. However, the first UE will not transmit any feedback information in the case that the determined relative location information indicates that the first UE is out of the communication range. In addition, the first UE will not transmit any feedback information in the case that it fails to correctly decode the control information. In the above two cases, whether a retransmission can be received in the first UE depends on how the second UE handles no signal being detected in the feedback resource, which will be specifically illustrated in the following text.

According to another embodiment of the present disclosure, the set of feedback resources may include a first feedback resource for carrying the HARQ ACK/NACK response in the case that the first UE being within the communication range and a second feedback resource for carrying the HARQ ACK/NACK response in the case the first UE being out of the communication range. For example, still assuming that a transmission includes two TBs, 2 bits for carrying the HARQ ACK/NACK response can be configured for each of the first feedback resource and second feedback resource. The first UE can indicate its relative location information by transmitting the HARQ ACK/NACK response on the first feedback resource or the second feedback resource.

Specifically, in the case that the first UE determines that it is within the communication range, the first UE may transmit the feedback information on the first feedback resource. The feedback information may include a HARQ ACK/NACK response for each TB of the set of TBs on the first feedback resource. For example, assuming that the transmission includes two TBs, the feedback information may include 1 bit with value "0" to represent NACK for a TB not being successfully decoded, include 1 bit with value "1" to represent ACK for a TB being successfully decoded. The first UE may receive retransmitted TB which is not being successfully decoded.

In the case that the first UE determines that it is out of the communication range, the first UE may transmit the feedback information on the second feedback resource. According to an embodiment of the present disclosure, the feedback information may include a HARQ ACK/NACK response for each TB of the set of TBs on the second feedback resource. For example, assuming that the transmission includes two TBs, the feedback information may include 1 bit with value "0" to represent NACK for a TB not being successfully decoded, include 1 bit with value "1" to represent ACK for a TB being successfully decoded. Accordingly, the first UE may not receive the retransmission of the corresponding TB to the first UE even though the HARQ ACK/NACK response for the corresponding TB indicates "non-acknowledgement (NACK)."

According to another embodiment of the present disclosure, in the case that the first UE determines that it is out of the communication range, the HARQ ACK/NACK response for each TB of the set of TBs on the second resource can be the same, for example, being ACK for each TB. The second UE may not perform retransmission to a first UE out of the communication range regardless of ACK or NACK being detected.

According to some other embodiments of the present disclosure, the first UE may only transmit the feedback information on the first feedback resource in the case that the determined relative location information indicates that the first UE is within the communication range. The feedback information may include a HARQ ACK/NACK response for each TB of the set of TBs. However, the first UE will not transmit any feedback information in the case that the determined relative location information indicates that the first UE is out of the communication range. In addition, the first UE will not transmit any feedback information in the case that it fails to correctly decode the control information. In the above two cases, whether a retransmission can be received in the first UE depends on how the second UE handles no signal being detected in the feedback resource, which will be specifically illustrated in the following text.

Figure 3:
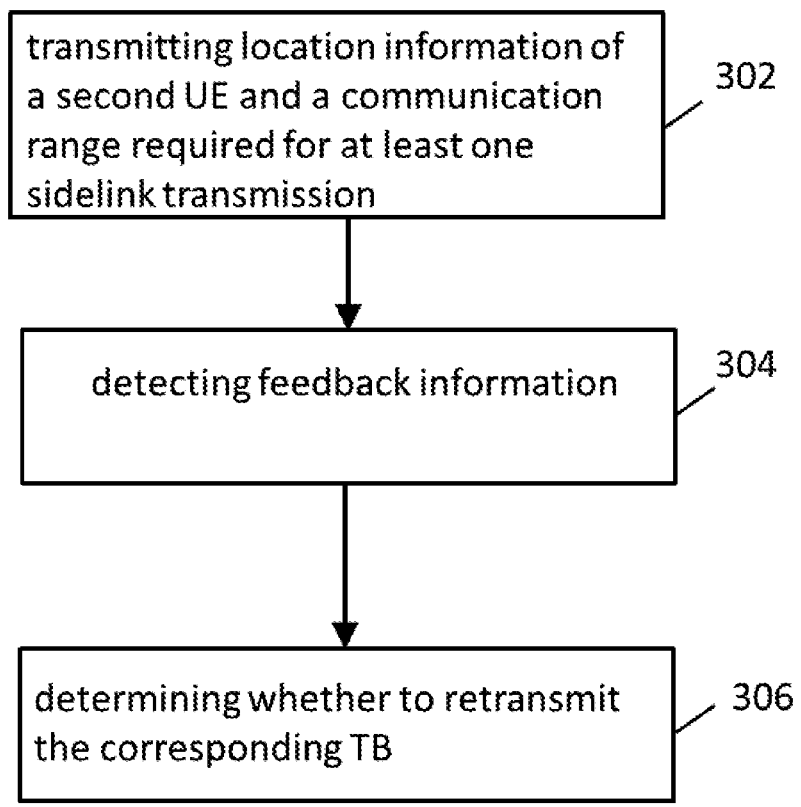
FIG. 3 is a flow chart illustrating a method for HARQ feedback according to another embodiment of the present disclosure.

FIG. 3 is a flow chart illustrating a method for HARQ feedback according to an embodiment of the present disclosure. The method may be performed by a Tx UE (hereinafter "a second UE"), for example, a UE 101a shown in FIG. 1. The second UE may be a V2X UE, such as a vehicle.

As shown in FIG. 3, in step 302, the second UE, for example UE 101a may transmit location information of the second UE and a communication range required for at least one sidelink transmission to a first UE. The communication range can be the Min required communication range provided in Table 5.2.1. Each of the at least one sidelink transmission may include a set of TBs, which may include one or more TBs. The location information and the communication range required for the at least one sidelink transmission can be indicated by the control information on the control channel, for example PSCCH. The control information may also indicate the set of TB in the data channel, for example PSSCH.

Specifically, the communication range may be provided by an application layer of the second UE or may be a default value mapped from the scenario associated with the at least one sidelink transmission. The communication range may indicate that the minimum distance that the QoS parameters need to be fulfilled for the at least one sidelink transmission. The communication range can be passed to the access stratum (AS) layer of the second UE together with the QoS parameters for dynamic control. Accordingly, the at least one sidelink transmission may have a corresponding communication range.

The first UE may be a Rx UE within the communication range, for example UE 101b as shown in FIG. 1. The first UE may also be a Rx UE out of the communication range, for example UE 101c as shown in FIG. 1. The first UE may be a V2X UE, such as a vehicle.

, The second UE may detect feedback information associated with a corresponding TB of the set of TBs from the first UE on a set of feedback resources in step 304. The detected feedback information may include at least one of: HARQ ACK/NACK response for each TB of the set of TBs, and relative location information of the first UE. The relative location information of the first UE is associated with the location information of the second UE and the communication range of the at least one sidelink transmission.

Specifically, the HARQ ACK/NACK response for each TB may be one bit with a value "0" or "1." For example, the value "0" may represent "NACK" for a TB, and value "1" may represent "ACK" for the TB. In another example, the value "1" may represent "NACK" for a TB, while the value "0" may represent "ACK" for the TB.

The relative location information may indicate that the first UE is within the communication range or the first UE is out of the communication range. The relative location information may be one bit with a value "0" or "1." For example, the value "0" may represent that the first UE is within the communication range and value "1" may represent that the first UE is out of the communication range. In another example, the value "0" may represent that the first UE is out of the communication range, while value "1" may represent that the first UE is within the communication range. The relative location information may be determined based on the location information of the second UE, the communication range, and the first UE's own location. For example, the first UE may estimate the distance between the first UE and the second UE based on the first UE's location and the second UE's location. The first UE can compare the distance with the communication range to determine whether the first UE is within the communication range or out of the communication range.

According to some embodiments of the present disclosure, the set of feedback resources may be configured by high-layer signaling from a base station, for example the radio resource control (RRC) signaling. The high-layer signaling may configure the set of feedback resources to have pre-defined association (e.g., time domain offset, frequency domain offset, or the combination of time domain offset and frequency domain offset) with transmitted PSCCH or PSSCH. In this case, the second UE may transfer the information indicated by the high-layer signaling received from the base station to the first UE.

According to some embodiments of the present disclosure, the second UE may indicate the set of feedback resources in the physical layer control information, for example the control information carried on PSCCH.

According to an embodiment of the present disclosure, the set of feedback resources may be one feedback resource for carrying the HARQ ACK/NACK response and the relative location information of the first UE simultaneously. For example, assuming that a transmission includes two TBs, and the set of feedback resources is configured to be only one feedback resource, 3 bits can be configured for the feedback resource, wherein 2 bits are used to represent the HARQ ACK/NACK response for the two TBs respectively and 1 bit is used to represent the relative location information of the first UE.

According to an embodiment of the present disclosure, the set of feedback resources may be configured to include a first feedback resource for carrying the HARQ ACK/NACK response in the case that the first UE being within the communication range and a second feedback resource for carrying the HARQ ACK/NACK response in the case the first UE being out of the communication range. For example, still assuming that a transmission includes two TBs, 2 bits for carrying the HARQ ACK/NACK response can be configured for each of the first feedback resource and second feedback resource. The second UE can determine whether the first UE is within or out of the communication range dependent on the HARQ ACK/NACK response being detected on the first feedback resource or the second feedback resource.

At step 306, the second UE may determine whether to retransmit the corresponding TB of the set of TBs based on the detection result of the feedback information.

According to an embodiment of the present disclosure, the set of feedback resources may be configured to be only one feedback resource for carrying the HARQ ACK/NACK response and the relative location information of the first UE simultaneously. The feedback information being detected may include a HARQ ACK/NACK response for each TB of the set of TBs, and the relative location information of the first UE. For example, assuming that a transmission includes two TBs, 3 bits can be configured for the feedback resource, wherein 2 bits are used to represent the HARQ ACK/NACK response for the two TBs respectively and 1 bit is used to represent the relative location information of the first UE. In another example, assuming that a transmission includes one TB, 2 bits can be configured for the feedback resource, wherein one bit is used to represent the HARQ ACK/NACK response for the TB and the other bit is used to represent the relative location information of the first UE.

Specifically, according to some embodiments of the present disclosure, the second UE may receive the feedback information on the one feedback resource regardless of the first UE being within or out of the communication range. The feedback information on the one feedback resource may include a HARQ ACK/NACK response for each TB of the set of TBs and the relative location information of the first UE indicating that the first UE is within or out of the communication range.

For example, assuming that the transmission includes two TBs, the feedback information may include 1 bit with value "0" to represent a TB not being successfully decoded, i.e., NACK, include 1 bit with value "1" to represent a TB being successfully decoded, i.e., ACK, and include 1 bit with value "1" to represent that the first UE is within the commination range. For the TB not being successfully decoded, the second UE may retransmit it after detecting the feedback information from the first UE due to the first UE being within the communication range.

According to another embodiment of the present disclosure, the feedback information may include 1 bit with value "0" to represent NACK for a TB not being successfully decoded, include 1 bit with value "1" to represent a TB being successfully decoded, i.e., ACK, and include 1 bit with value "0" to represent that the first UE is out of the commination range. For the TB not being successfully decoded, the second UE may not retransmit it after detecting the feedback information from the first UE due to the first UE being out of the communication range.

According to yet another embodiment of the present application, in the case that the relative location information indicates that the first UE is out of the communication range, the detected HARQ ACK/NACK response may be the same for each TB, for example, being ACK for each TB. The Tx UE may not perform retransmission to a RX UE out of the communication range regardless of ACK or NACK being detected.

According to another embodiment of the present disclosure, the set of feedback resources may be configured to include a first feedback resource for carrying the HARQ ACK/NACK response in the case that the first UE being within the communication range and a second feedback resource for carrying the HARQ ACK/NACK response in the case the first UE being out of the communication range. For example, still assuming that a transmission includes two TBs, 2 bits for carrying the HARQ ACK/NACK response can be configured for each of the first feedback resource and second feedback resource. The second UE can determine the relative location information of the first UE by detecting the HARQ ACK/NACK response on the first feedback resource or the second feedback resource.

Specifically, in the case that the feedback information is received on the first feedback resource, the second UE can determine that the first UE is within the communication range. The feedback information may include a HARQ ACK/NACK response for each TB of the set of TBs on the first feedback resource. For example, assuming that the transmission includes two TBs, the feedback information may include 1 bit with value "0" to represent a TB not being successfully decoded, i.e., NACK, include 1 bit with value "1" to represent a TB being successfully decoded, i.e., ACK. The second UE may retransmit the TB being indicated NACK.

In the case that the feedback information is received on the second feedback resource, according to an embodiment of the present disclosure, the second UE can determine that the first UE is out of the communication range. The feedback information may include a HARQ ACK/NACK response for each TB of the set of TBs on the second feedback resource. For example, assuming that the transmission includes two TBs, the feedback information may include 1 bit with value "0" to represent a TB not being successfully decoded, i.e., NACK, include 1 bit with value "1" to represent ACK for a TB being successfully decoded, i.e., ACK. Accordingly, the first UE may not retransmit the corresponding TB to the first UE even though the HARQ ACK/NACK response for the corresponding TB indicates NACK. According to another embodiment of the present disclosure, the HARQ ACK/NACK response for each TB of the set of TBs on the second resource can be the same, for example, being ACK for each TB. The second UE may not perform retransmission to a first UE out of the communication range regardless of ACK or NACK being detected.

According to another embodiment of the present disclosure, the second UE may detect no feedback information on the set of resources. As stated above, the detection of no feedback information may be caused by several reasons. For example, one reason is the DTX of the Rx UE. That is, the Rx UE fails to decode the control information in the control channel and thus does not transmit any signal on the feedback resources. In another case, considering being out of the communication range, the Rx UE does not transmit any signal even if it has correctly decoded the TB. In yet another case, the first UE has transmitted the feedback information (i.e., ACK/NACK), but the second UE failed to detect the feedback information due to bad channel condition etc.

In the case that no feedback information is detected for a corresponding TB, according to an embodiment of the present disclosure, the second UE may determine whether to retransmit the corresponding TB to the first UE based on a predefined criterion. For example, the predefined criterion may be always retransmitting the corresponding TB or always not retransmitting the corresponding TB. According to another embodiment of the present disclosure, the second UE may determine whether to retransmit the corresponding TB to the first UE based on previously received relative location information of the first UE, i.e., the relative location information obtained from previous feedback information from the first UE. For example, in the case that the previously received relative location information of the first UE indicates that the first UE is within the communication range, the second UE may determine to retransmit the corresponding TB. In the case that the previously received relative location information of the first UE indicates that the first UE is out of the communication range, the second UE may determine not to retransmit the corresponding TB. In the case that the previously received relative location information of the first UE cannot be obtained, the second UE may determine to retransmit or not to retransmit the corresponding TB by itself. According to yet another embodiment, the second UE may determine to retransmit or not to retransmit the corresponding TB based on the QoS requirement for the corresponding TB. According to yet another embodiment, the second UE may determine to retransmit or not to retransmit the corresponding TB based on the UE implementation.

According to embodiments of the present disclosure, the HARQ-ACK information mapping described in TS 38.213 specified by 3GPP may change. Specifically, the following content may be added to TS 38.213.

If a UE transmits a PSFCH with HARQ ACK/NACN response and its relative location information using PSFCH (or PSCCH) format 0, the UE determines values $m_0$ and $m_{CS}$ for computing a value of cyclic shift $\alpha$ [4, TS 38.211] where $m_0$ is provided by initialCyclicShift of PUCCH-format0, and $m_{CS}$ is determined from the value of two HARQ ACK/NACN response bits as in Table A below.

TABLE A

Mapping of values for HARQ ACK/NACN response and relative location information bits to sequences for PUCCH format 0.

| | HARQ ACK/NACN response and relative location information value | | | |
|---|---|---|---|---|
| | {0, 0} | {0, 1} | {1, 1} | {1, 0} |
| Sequence cyclic shift | $m_{cs} = 0$ | $m_{cs} = 3$ | $m_{cs} = 6$ | $m_{cs} = 9$ |

Figure 4:
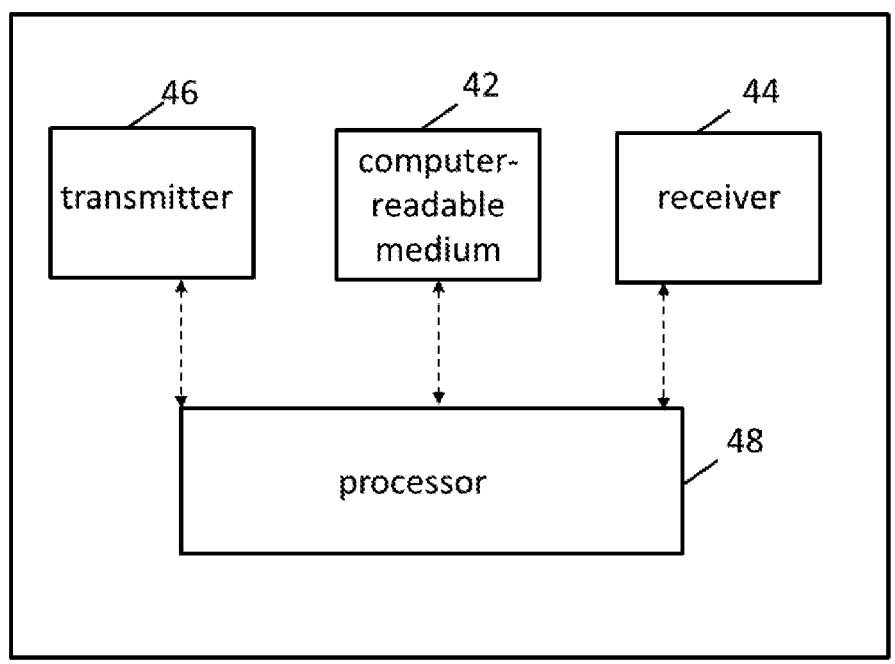
FIG. 4 illustrates a block diagram of an apparatus for HARQ feedback according to an embodiment of the present disclosure.

FIG. 4 illustrates a block diagram of an apparatus 400 for HARQ feedback according to an embodiment of the present disclosure, wherein the apparatus may be a Rx UE, for example the first UE, which may be UE 101b or UE 101c as shown in FIG. 1.

Referring to FIG. 4, the apparatus 400 may include at least one non-transitory computer-readable medium 42 having computer executable instructions stored therein; at least one receiver 44; at least one transmitter 46; and at least one processor 48 coupled to the at least one non-transitory computer-readable medium 42, the at least one receiver 44 and the at least one transmitter 46. The computer executable instructions can be programmed to implement a method according to an embodiment of the present disclosure, for example the method shown in FIG. 2 with the at least one receiver 44, the at least one transmitter 46 and the at least one processor 48.

Figure 5:
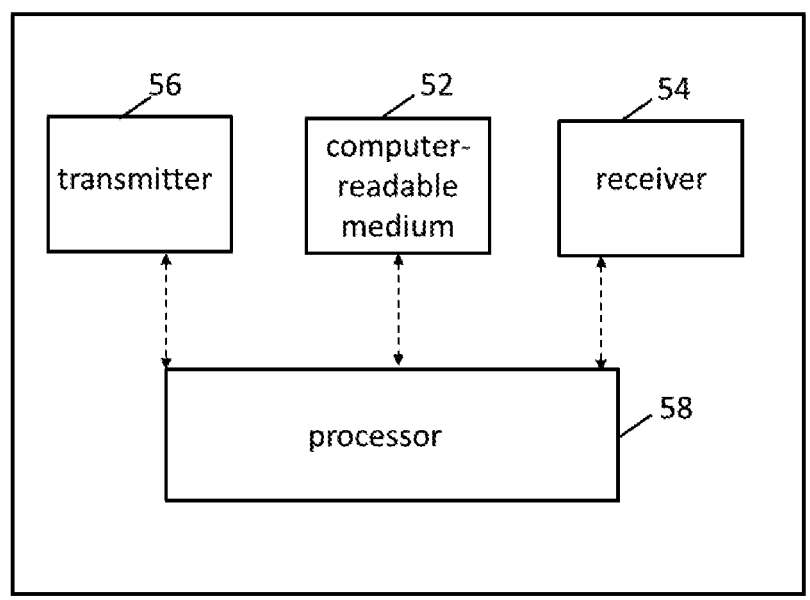
FIG. 5 illustrates a block diagram of an apparatus for HARQ feedback according to another embodiment of the present disclosure.

FIG. 5 illustrates a block diagram of an apparatus 500 for HARQ feedback according to an embodiment of the present disclosure, wherein the apparatus may be a Tx UE, for example the second UE, which may be the UE 101a as shown in FIG. 1.

Referring to FIG. 5, the apparatus 500 may include at least one non-transitory computer-readable medium 52 having computer executable instructions stored therein; at least one receiver 54; at least one transmitter 56; and at least one processor 58 coupled to the at least one non-transitory computer-readable medium 52, the at least one receiver 54 and the at least one transmitter 56. The computer executable instructions can be programmed to implement a method according to an embodiment of the present disclosure, for example, the method shown in FIG. 3 with the at least one receiver 52, the at least one transmitter 54 and the at least one processor 56.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

The invention claimed is:

1. A method performed by a second user equipment (UE), the method comprising:
    transmitting, to a first UE, location information of the second UE and a communication range required for at least one sidelink transmission from the second UE, wherein each of the at least one sidelink transmission comprises a set of transport blocks (TBs);
    detecting feedback information associated with a corresponding TB of the set of TBs from the first UE on a set of feedback resources, wherein the detected feedback information comprises a hybrid automatic repeat request (HARQ) acknowledgement (ACK) or non-acknowledgement (NACK) response for each TB of the set of TBs;
    determining whether to retransmit the corresponding TB of the set of TBs based on the detection result of the feedback information; and
    in response to the HARQ ACK or NACK response for the corresponding TB being on a first feedback resource and indicating NACK, retransmitting the corresponding TB.

2. The method of claim 1, wherein the detected feedback information comprises:
    a hybrid automatic repeat request (HARQ) acknowledgement (ACK) or non-acknowledgement (NACK) response for each TB of the set of TBs;
    relative location information of the first UE, which is associated with the location information of the second UE and the communication range;
    or a combination thereof.

3. The method of claim 2, wherein the relative location information indicates that the first UE is within the communication range or the first UE is out of the communication range.

4. The method of claim 3, further comprising:
    in response to the relative location information indicating the first UE being out of the communication range, determining the corresponding TB not to be retransmitted to the first UE.

5. The method of claim 2, wherein the set of feedback resources comprises one feedback resource for carrying the HARQ ACK or NACK response and the relative location information of the first UE simultaneously.

6. The method of claim 2, wherein the set of feedback resources comprises a first feedback resource for carrying the HARQ ACK or NACK response if the first UE is within the communication range and a second feedback resource for carrying the HARQ ACK or NACK response if the first UE is out of the communication range.

7. The method of claim 6, further comprising:
in response to the HARQ ACK or NACK response for the corresponding TB being on the first feedback resource and indicating NACK, retransmitting the corresponding TB.

8. The method of claim 6, wherein the HARQ ACK or NACK response for each TB on the second feedback resource indicates ACK.

9. The method of claim 6, further comprising:
in response to the HARQ ACK or NACK response for the corresponding TB being on the second feedback resource, determining the corresponding TB not to be retransmitted to the first UE.

10. The method of claim 1, wherein the set of feedback resources is configured by high-layer signaling.

11. The method of claim 1, comprising indicating the set of feedback resources by physical layer control information.

12. The method of claim 1, further comprising:
in response to no feedback information being detected, performing one of the following:
determining whether to retransmit the corresponding TB to the first UE based on a predefined criterion;
determining whether to retransmit the corresponding TB to the first UE based on previously received relative location information of the first UE; or
determining whether to retransmit the corresponding TB to the first UE based on UE implementation.

13. The method of claim 1, wherein the communication range indicates a minimum distance that quality of service parameters of the at least one sidelink transmission need to be fulfilled.

14. A first user equipment (UE), comprising:
at least one memory; and
at least one processor coupled with the at least one memory and configured to cause the first UE to:
receive location information of a second UE and a communication range required for at least one sidelink transmission from the second UE, wherein each of the at least one sidelink transmission comprises a set of transport blocks (TBs);
determine relative location information of the first UE based on the received location information of the second UE and the communication range;
transmit feedback information for the set of TBs on a set of feedback resources at least based on the relative location information, wherein the feedback information comprises a hybrid automatic repeat request (HARQ) acknowledgement (ACK) or non-acknowledgement (NACK) response for each TB of the set of TBs; and
in response to the HARQ ACK or NACK response for the corresponding TB being on a first feedback resource and indicating NACK, receive a retransmission of the corresponding TB.

15. The first UE of claim 14, wherein the relative location information indicates that the first UE is within the communication range or the first UE is out of the communication range.

16. The first UE of claim 15, wherein the HARQ ACK or NACK response for each TB indicates "acknowledgement (ACK)" in response to the first UE being out of the communication range.

17. The first UE of claim 14, wherein the set of feedback resources is one feedback resource for carrying the HARQ ACK or NACK response and the relative location information of the first UE simultaneously.

18. The first UE of claim 14, wherein the set of feedback resources comprises first feedback resource for carrying the HARQ ACK or NACK response if the first UE being within the communication range and a second feedback resource for carrying the HARQ ACK or NACK response if the first UE being out of the communication range.

19. A second user equipment (UE), comprising:
at least one memory; and
at least one processor coupled with the at least one memory and configured to cause the second UE to:
transmit, to a first UE, location information of a second UE and a communication range required for at least one sidelink transmission from the second UE, wherein each of the at least one sidelink transmission comprises a set of transport blocks (TBs);
detect feedback information associated with a corresponding TB of the set of TBs from the first UE on a set of feedback resources, wherein the detected feedback information comprises a hybrid automatic repeat request (HARQ) acknowledgement (ACK) or non-acknowledgement (NACK) response for each TB of the set of TBs;
determine whether to retransmit the corresponding TB of the set of TBs based on the detection result of the feedback information; and
in response to the HARQ ACK or NACK response for the corresponding TB being on a first feedback resource and indicating NACK, retransmit the corresponding TB.

20. A processor for wireless communication, comprising:
at least one controller coupled with at least one memory and configured to cause the processor to:
transmit, to a first user equipment (UE), location information of a second UE and a communication range required for at least one sidelink transmission from the second UE, wherein each of the at least one sidelink transmission comprises a set of transport blocks (TBs);
detect feedback information associated with a corresponding TB of the set of TBs from the first UE on a set of feedback resources, wherein the detected feedback information comprises a hybrid automatic repeat request (HARQ) acknowledgement (ACK) or non-acknowledgement (NACK) response for each TB of the set of TBs;
determine whether to retransmit the corresponding TB of the set of TBs based on the detection result of the feedback information; and
in response to the HARQ ACK or NACK response for the corresponding TB being on a first feedback resource and indicating NACK, retransmit the corresponding TB.

* * * * *